(12) United States Patent
Choi et al.

(10) Patent No.: US 12,149,583 B2
(45) Date of Patent: Nov. 19, 2024

(54) METHOD AND SYSTEM FOR SELECTING OPTIMAL SYNCHRONIZATION BROKER FOR EACH WORKLOAD

(71) Applicant: Korea Electronics Technology Institute, Seongnam-si (KR)

(72) Inventors: Won Gi Choi, Seoul (KR); Sang Shin Lee, Yongin-si (KR); Min Hwan Song, Yongin-si (KR); Jee Hyeong Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/380,968

(22) Filed: Oct. 17, 2023

(65) Prior Publication Data
US 2024/0137408 A1 Apr. 25, 2024
US 2024/0236177 A9 Jul. 11, 2024

(30) Foreign Application Priority Data
Oct. 19, 2022 (KR) .................. 10-2022-0134534

(51) Int. Cl.
*G06F 13/00* (2006.01)
*H04L 67/1008* (2022.01)
*H04L 67/1012* (2022.01)

(52) U.S. Cl.
CPC ...... *H04L 67/1008* (2013.01); *H04L 67/1012* (2013.01)

(58) Field of Classification Search
CPC ............ H04L 67/1008; H04L 67/1012; H04N 21/4665; H04N 21/4662; H04N 21/466

USPC .............. 709/232, 230, 233–235, 202, 226; 706/45, 23, 16, 15; 718/105, 102, 100
See application file for complete search history.

(56) References Cited

U.S. PATENT DOCUMENTS

| 2023/0281277 A1* | 9/2023 | Verwey ................ G06F 18/217 706/45 |
| 2024/0154852 A1* | 5/2024 | Karapantelakis ... H04L 41/5009 |

FOREIGN PATENT DOCUMENTS

| CN | 108710634 A | 10/2018 |
| KR | 10-2021-0006707 A | 1/2021 |

OTHER PUBLICATIONS

Korean Office Action issued on Aug. 30, 2023 in corresponding Korean Patent Application No. 10-2022-0134534 (3 pages in English, 5 pages in Korean).

* cited by examiner

*Primary Examiner* — Kenneth R Coulter
(74) *Attorney, Agent, or Firm* — NSIP Law

(57) ABSTRACT

There are provided a method and a system for selecting an optimal synchronization broker for each workload. A system for selecting an optimal synchronization broker for each workload according to an embodiment includes: a storage unit including a database that contains specialist recommendation information including information on a correct protocol that is recommended by a specialist with respect to a service specification and data transmission requirements; and a processor configured to determine an optimal in-bound protocol and an optimal out-bound protocol according to the data transmission requirements through a decision tree model that is trained by using the specialist recommendation information as training data.

19 Claims, 4 Drawing Sheets

METHOD AND SYSTEM FOR SELECTING OPTIMAL SYNCHRONIZATION BROKER FOR EACH WORKLOAD

CLAIM OF PRIORITY

This application is based on and claims priority under 35 U.S.C. § 119 to Korean Patent Application No. 10-2022-0134534, filed on Oct. 19, 2022, in the Korean Intellectual Property Office, the disclosure of which is herein incorporated by reference in its entirety.

BACKGROUND

Field

The disclosure relates to a method and a system for selecting an optimal synchronization broker for each workload, and more particularly, to a method and a system for selecting an optimal synchronization broker for each workload in a data synchronization broker system which collects data generated in various systems, such as a database system, an Internet of Things (IoT) platform, a file, etc., in real time, and transmits the data to an information system.

Description of Related Art

In a related-art data synchronization broker system, which collects data generated in various systems, such as a database system, an IoT platform, a file, etc., in real time, and transmits the data to an information system, there may be problems that a single synchronization protocol that is initially determined by a manager and a developer is used without integrating and managing various transmission protocols, and a previously used transmission protocol is used without automatically reflecting requirements even when a new service is registered.

A skilled manager of a data synchronization broker system may select and use an optimal data protocol based on a decision made by his/her experience, but, in the case of a normal user who is not accustomed to a data synchronization broker system, there is a demerit that it is difficult to select an optimal data protocol for service.

In addition, a related-art in-bound, out-bound synchronization method is normally constituted with a single protocol, and hence, has a demerit that it is difficult to reflect different service requirements occurring due to in-bound, out-bound characteristics.

SUMMARY

The disclosure has been developed in order to solve the above-described problems, and an object of the disclosure is to provide, in a data synchronization broker system which collects data generated in various systems, such as a database system, an Internet of Things (IoT) platform, a file, etc., in real time, and transmits data to an information systems, a method and a system for selecting an optimal synchronization broker, which configure a synchronization method with a pair of optimal data transmission protocols fitting requirements of a user or an application, and maximize whole system performance.

According to an embodiment of the disclosure to achieve the above-described object, a system for selecting an optimal synchronization broker for each workload may include: a storage unit including a database that contains specialist recommendation information including information on a correct protocol that is recommended by a specialist with respect to a service specification and data transmission requirements; and a processor configured to determine an optimal in-bound protocol and an optimal out-bound protocol according to the data transmission requirements through a decision tree model that is trained by using the specialist recommendation information as training data.

The processor may include: a decision tree module configured to cause the processor to determine the optimal in-bound protocol and the optimal out-bound protocol according to the data transmission requirements through the decision tree model; and a synchronization engine module configured to select an in-bound synchronization broker and an out-bound synchronization broker based on the determined in-bound protocol and out-bound protocol.

In addition, the data transmission requirements may include in-bound characteristic information and out-bound characteristic information.

The decision tree module may determine the optimal in-bound protocol and the optimal out-bound protocol individually according to the in-bound characteristic information and the out-bound characteristic information.

The in-bound protocol and the out-bound protocol which are determined may be one of Kafka, AMQP, MQTT, and HTTP.

The in-bound characteristic information and the out-bound characteristic information may include information on a transmission speed (Ingest speed) of data, a message size, a CPU resource of a synchronization engine, a memory resource of a synchronization engine, a type of data, connectivity with a data source and a data sink, transmission requirements, and server resource use requirements.

The in-bound synchronization broker may be a synchronization broker that is connected with a data source.

The out-bound synchronization broker may be a synchronization broker that is connected with a data sink.

The service specification may include service requirements, identification information of a data sink, and identification information of a data source.

According to another embodiment of the disclosure, a method for selecting an optimal synchronization broker for each workload may include: establishing, by a system, a database by using specialist recommendation information including information on a correct protocol that is recommended by a specialist with respect to a service specification and data transmission requirements; and determining, by the system, an optimal in-bound protocol and an optimal out-bound protocol according to the data transmission requirements through a decision tree model that is trained by using the specialist recommendation information in the database as training data.

According to still another embodiment of the disclosure, a system for selecting an optimal synchronization broker for each workload may include: a storage unit including a database that contains specialist recommendation information including information on a correct protocol that is recommended by a specialist with respect to a service specification and data transmission requirements; and a processor configured to train a decision tree model by using the specialist recommendation information as training data, and to determine an optimal in-bound protocol and an optimal out-bound protocol according to the data transmission requirements through the trained decision tree model.

According to yet another embodiment of the disclosure, a method for selecting an optimal synchronization broker for each workload may include: establishing, by a system, a database by using specialist recommendation information including information on a correct protocol that is recommended by a specialist with respect to a service specification and data transmission requirements; training, by the system, a decision tree model by using the specialist recommendation information in the database as training data; and determining an optimal in-bound protocol and an optimal out-bound protocol according to the data transmission requirements through the trained decision tree model.

According to embodiments of the disclosure as described above, in a data synchronization broker system, a synchronization method may be configured with a pair of optimal data transmission protocols (an in-bound protocol and an out-bound protocol) fitting requirements of a user or an application, so that performance in collecting data generated in various systems in real time and transmitting data to an information system may be maximized.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Figure 1:
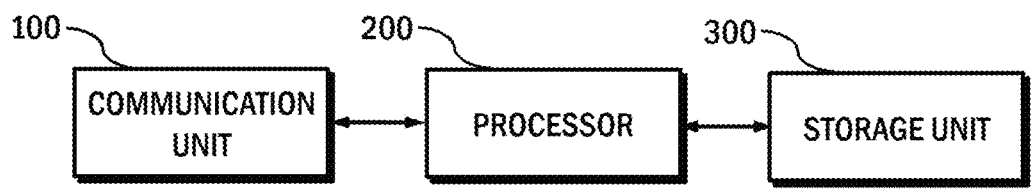
FIG. 1 is a view provided to explain a configuration of a system for selecting an optimal synchronization broker for each workload according to an embodiment of the disclosure.

FIG. 1 is a view provided to explain a configuration of a system for selecting an optimal synchronization broker for each workload according to an embodiment of the disclosure.

Referring to FIG. 1, a system for selecting an optimal synchronization broker for each workload (hereinafter, referred to as a "system") may include a communication unit 100, a processor 200, and a storage unit 300.

The communication unit 100 is a communication means for connecting the system to data sources 10-1 to 10-N and data sinks 20-1 to 20-N through a communication network.

The storage unit 300 is a storage medium that stores a program necessary for operating the processor 200, and data.

For example, the storage unit 300 may include a database (DB) that contains specialist recommendation information including information on a correct protocol that is recommended by a specialist with respect to a service specification and data transmission requirements.

The processor 200 may be provided to deal with various operations of the system.

Specifically, the processor 200 may train a decision tree model by using specialist recommendation information stored in the database as training data, and, when a new service request is inputted or the system is used by a new user, the processor 200 may determine an optimal in-bound protocol and an optimal out-bound protocol according to data transmission requirements through the trained decision tree model.

In addition, the processor 200 may collect data by using the determined optimal in-bound protocol and out-bound protocol, and may transmit the data to an information system.

Figure 2:
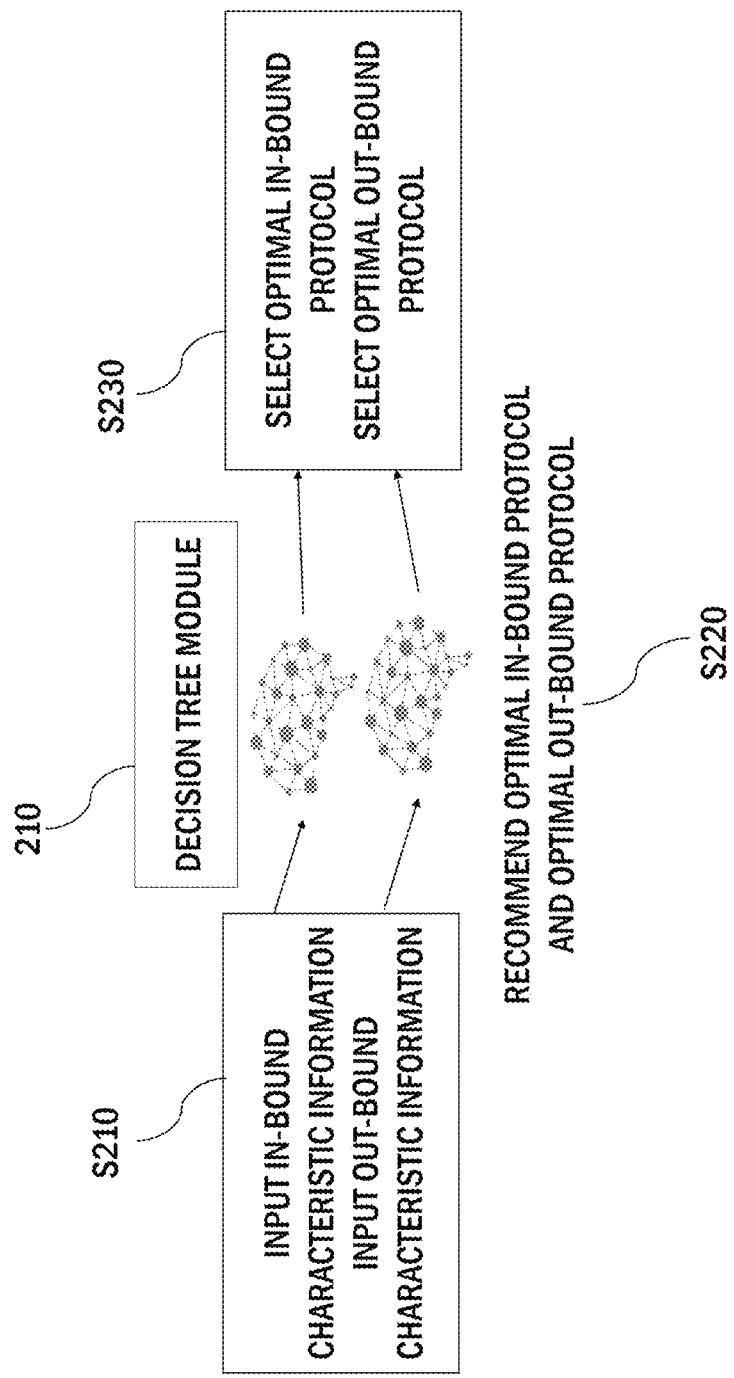
FIG. 2 is a view provided to explain a decision tree module according to an embodiment of the disclosure.
Figure 3:
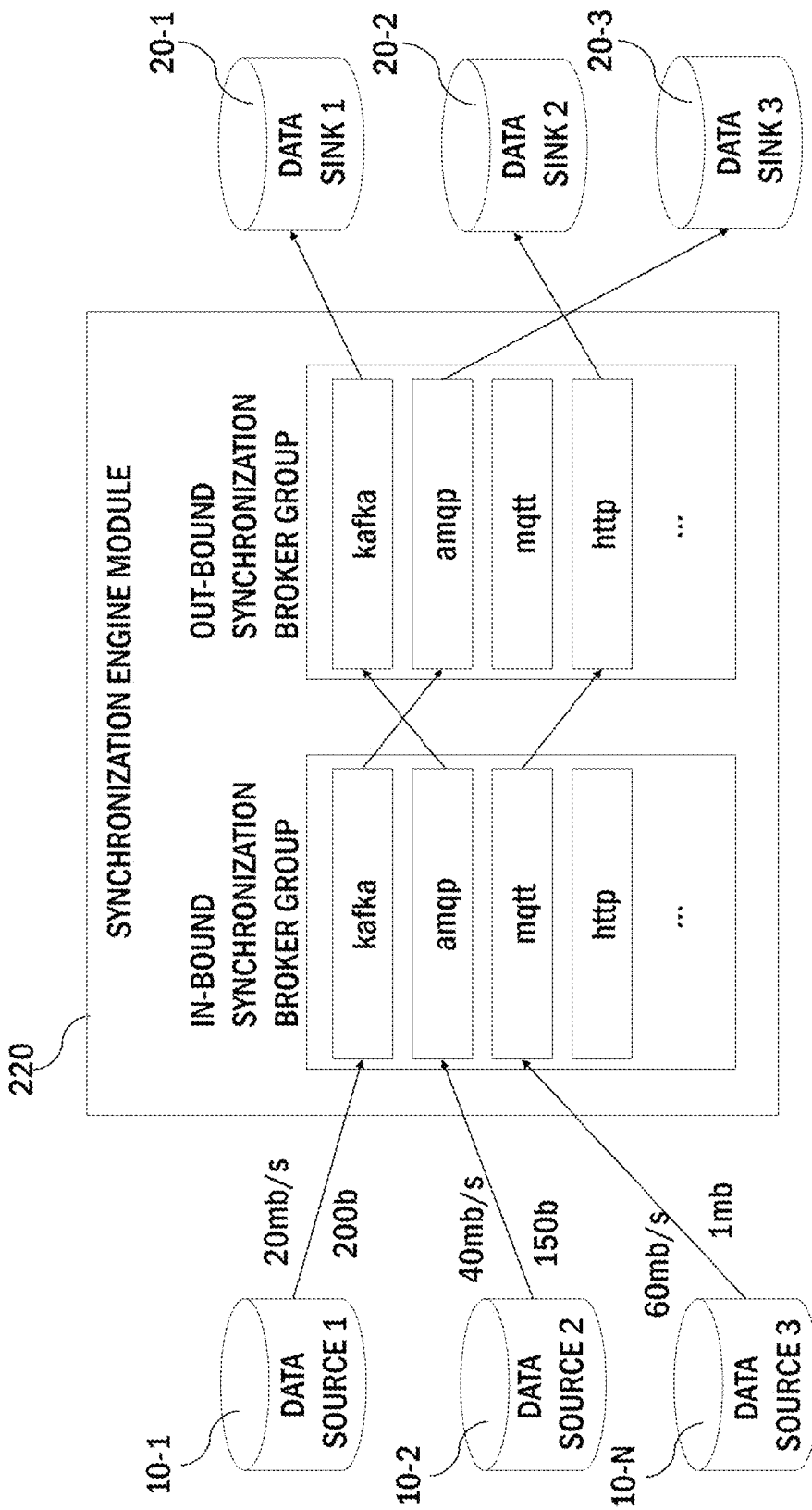
FIG. 3 is a view provided to explain a synchronization engine module according to an embodiment of the disclosure.

FIG. 2 is a view provided to explain a decision tree module 210 according to an embodiment of the disclosure, and FIG. 3 is a view provided to explain a synchronization engine module 220 according to an embodiment of the disclosure.

Referring to FIGS. 2 and 3, the processor 200 may include a decision tree module 210 and a synchronization engine module 220.

When data transmission requirements including in-bound characteristic information and out-bound characteristic information are inputted (S210), the decision tree module 210 may recommend an optimal in-bound protocol and an optimal out-bound protocol according to the data transmission requirements through a trained decision tree model (S220), and may cause the recommended in-bound protocol and out-bound protocol to be selected (S230). In this case, the determined in-bound protocol and out-bound protocol may be one of Kafka, AMQP, MQTT, and HTTP.

To summarize, the decision tree module 210 individually determines an optimal in-bound protocol and an optimal out-bound protocol according to in-bound characteristic information and out-bound characteristic information, so that different service requirements generated due to different in-bound characteristics and out-bound characteristics are effectively reflected.

Herein, data transmission requirements may include in-bound characteristic information and out-bound characteristic information. Specifically, in-bound characteristic information and out-bound characteristic information may include information on a transmission speed of data (Ingest speed), a message size, a CPU resource of a synchronization engine, a memory resource of a synchronization engine, a type of data, connectivity with data sources 10-1 to 10-N and data sinks 20-1 to 20-N, transmission requirements, and server resource use requirements.

In addition, information on connectivity with the data sources 10-1 to 10-N and the data sinks 20-1 to 20-N refers to information indicating whether the number of data sources 10-1 to 10-N or data sinks 20-1 to 20-N connected to a single in-bound synchronization broker 221 or a single out-bound synchronization broker 222 is 1 or 2.

The synchronization engine module 220 may select an in-bound synchronization broker 221 and an out-bound synchronization broker 222 based on the determined in-bound protocol and out-bound protocol.

Specifically, the synchronization engine module 220 may respectively select an in-bound synchronization broker 221 to which the determined in-bound protocol is applied from among the plurality of in-bound synchronization brokers 221, and an out-bound synchronization broker 222 to which the determined out-bound protocol is applied from among the plurality of out-bound synchronization brokers 222, based on the determined in-bound protocol and out-bound protocol.

Herein, the in-bound synchronization broker 221 refers to a synchronization broker that is connected with the data sources 10-1 to 10-N, and the out-bound synchronization broker 222 refers to a synchronization broker that is connected with the data sinks 20-1 to 20-N.

Figure 4:
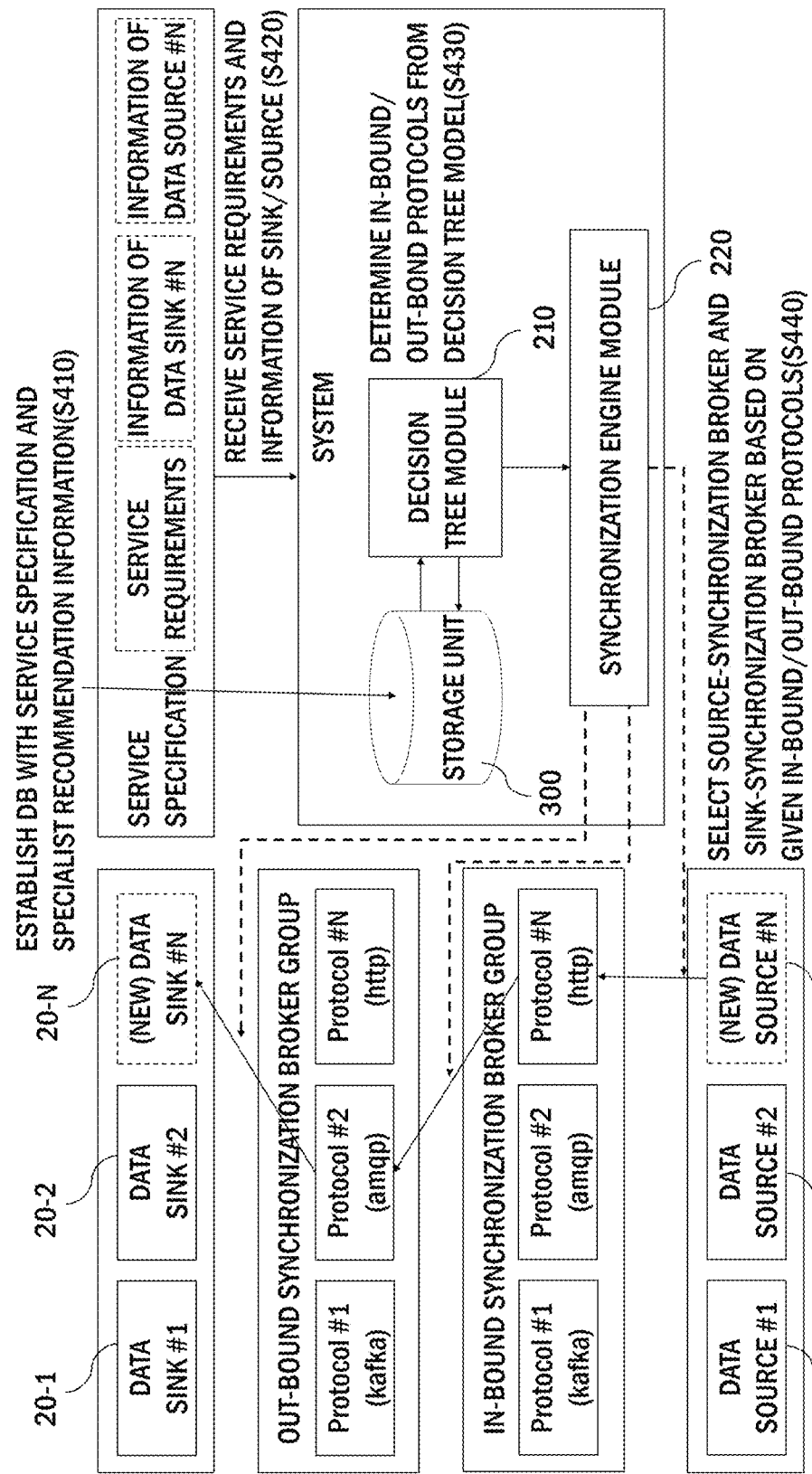
FIG. 4 is a view provided to explain a method for selecting an optimal synchronization broker for each workload according to an embodiment of the disclosure.

FIG. 4 is a view provided to explain a method for selecting an optimal synchronization broker for each workload according to an embodiment of the disclosure.

The method for selecting an optimal synchronization broker for each workload according to an embodiment may be executed by the system described above with reference to FIGS. 1 to 3.

Referring to FIG. 4, the system may establish, in the storage unit 300, a database (DB) that contains specialist recommendation information including information on a correct protocol that is recommended by a specialist with respect to a service specification and data transmission requirements (S410).

Herein, the service specification may include service requirements, identification information of the data sinks 20-1 to 20-N and identification information of the data sources 10-1 to 10-N.

In addition, when service requirements and information on the data sinks 20-1 to 20-N and information on the data sources 10-1 to 10-N are received (S420), the system may determine an optimal in-bound protocol and an optimal out-bound protocol according to the service requirements and data transmission requirements through a trained decision tree model (S430).

The system may select an in-bound synchronization broker 221 and an out-bound synchronization broker 222 based on the determined in-bound protocol and out-bound protocol through the synchronization engine module 220 (S440), and may collect data through the selected in-bound synchronization broker 221 and out-bound synchronization broker 222 and may transmit the data to an information system.

Herein, when the determined in-bound protocol and out-bound protocol are different types of protocols, the synchronization engine module 220 may respectively select an in-bound synchronization broker 221 and an out-bound synchronization broker 222 which are different types of synchronization brokers, based on the different types of protocols.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A system for selecting an optimal synchronization broker for each workload, the system comprising:
   a storage unit comprising a database that contains specialist recommendation information including information on a correct protocol that is recommended by a specialist with respect to a service specification and data transmission requirements; and
   a processor configured to determine an optimal in-bound protocol and an optimal out-bound protocol according to the data transmission requirements through a decision tree model that is trained by using the specialist recommendation information as training data.

2. The system of claim 1, wherein the processor comprises:
   a decision tree module configured to cause the processor to determine the optimal in-bound protocol and the optimal out-bound protocol according to the data transmission requirements through the decision tree model; and
   a synchronization engine module configured to select an in-bound synchronization broker and an out-bound synchronization broker based on the determined optimal in-bound protocol and the determined optimal out-bound protocol.

3. The system of claim 2, wherein the data transmission requirements include in-bound characteristic information and out-bound characteristic information.

4. The system of claim 3, wherein the decision tree module is configured to determine the optimal in-bound protocol and the optimal out-bound protocol individually according to the in-bound characteristic information and the out-bound characteristic information.

5. The system of claim 4, wherein the optimal in-bound protocol and the optimal out-bound protocol which are determined are one of Kafka, AMQP, MQTT, and HTTP.

6. The system of claim 3, wherein the in-bound characteristic information and the out-bound characteristic information include information on a transmission speed (Ingest speed) of data, a message size, a CPU resource of a synchronization engine, a memory resource of a synchronization engine, a type of data, connectivity with a data source and a data sink, transmission requirements, and server resource use requirements.

7. The system of claim 2, wherein the in-bound synchronization broker is a synchronization broker that is connected with a data source.

8. The system of claim 2, wherein the out-bound synchronization broker is a synchronization broker that is connected with a data sink.

9. The system of claim 1, wherein the service specification includes service requirements, identification information of a data sink, and identification information of a data source.

10. A method for selecting an optimal synchronization broker for each workload, the method comprising:
    establishing, by a system, a database by using specialist recommendation information including information on a correct protocol that is recommended by a specialist with respect to a service specification and data transmission requirements; and
    determining, by the system, an optimal in-bound protocol and an optimal out-bound protocol according to the data transmission requirements through a decision tree model that is trained by using the specialist recommendation information in the database as training data.

11. The method of claim 10, comprises:
    determining the optimal in-bound protocol and the optimal out-bound protocol according to the data transmission requirements through the decision tree model; and
    selecting an in-bound synchronization broker and an out-bound synchronization broker based on the determined optimal in-bound protocol and the determined optimal out-bound protocol.

12. The method of claim 11, wherein the data transmission requirements include in-bound characteristic information and out-bound characteristic information.

13. The method of claim 12, comprises determining the optimal in-bound protocol and the optimal out-bound protocol individually according to the in-bound characteristic information and the out-bound characteristic information.

14. The method of claim 13, wherein the optimal in-bound protocol and the optimal out-bound protocol which are determined are one of Kafka, AMQP, MQTT, and HTTP.

15. The method of claim 12, wherein the in-bound characteristic information and the out-bound characteristic information include information on a transmission speed (Ingest speed) of data, a message size, a CPU resource of a synchronization engine, a memory resource of a synchronization engine, a type of data, connectivity with a data source and a data sink, transmission requirements, and server resource use requirements.

16. The method of claim 11, wherein the in-bound synchronization broker is a synchronization broker that is connected with a data source.

17. The method of claim 11, wherein the out-bound synchronization broker is a synchronization broker that is connected with a data sink.

18. The method of claim 10, wherein the service specification includes service requirements, identification information of a data sink, and identification information of a data source.

19. A system for training a decision tree model used in selecting an optimal synchronization broker for each workload, the system comprising:
    a storage unit comprising a database that contains specialist recommendation information including information on a correct protocol that is recommended by a specialist with respect to a service specification and data transmission requirements; and
    a processor configured to train a decision tree model by using the specialist recommendation information as training data,
    wherein the trained decision tree model is used to determine an optimal in-bound protocol and an optimal out-bound protocol according to the data transmission requirements through the trained decision tree model.

* * * * *